July 3, 1956 — A. C. HUDSON — 2,753,450
DUAL OUTPUT MIXER FOR TRANSMIT-RECEIVE SYSTEM
Filed March 14, 1952 — 3 Sheets-Sheet 1

Inventor
Arthur C. Hudson
By W. R. Meredith
Attorney

Inventor
Arthur C. Hudson
By W. R. Meredith
Attorney

July 3, 1956 A. C. HUDSON 2,753,450
DUAL OUTPUT MIXER FOR TRANSMIT-RECEIVE SYSTEM
Filed March 14, 1952 3 Sheets-Sheet 3
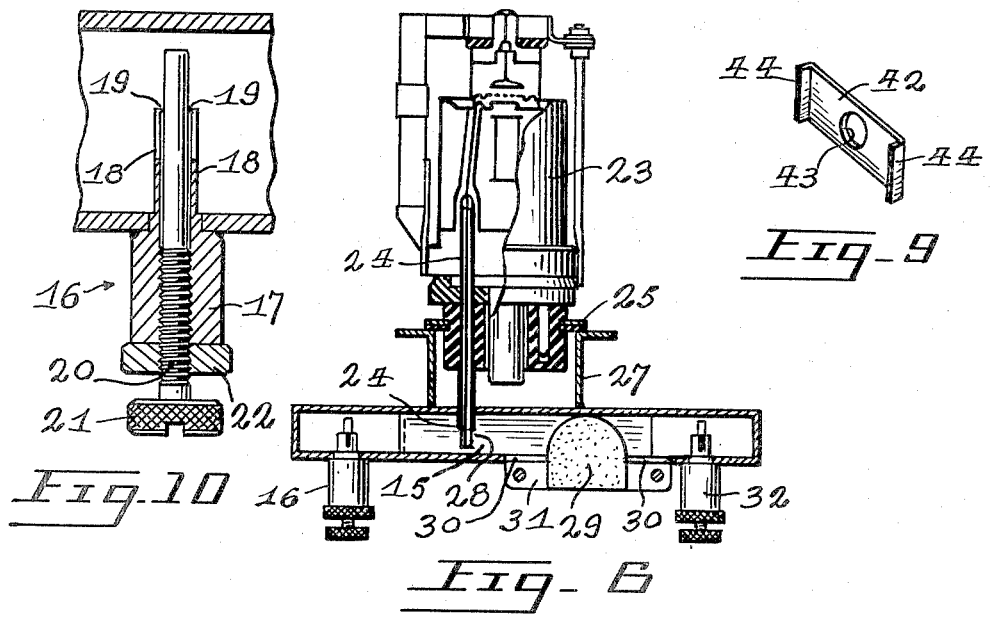
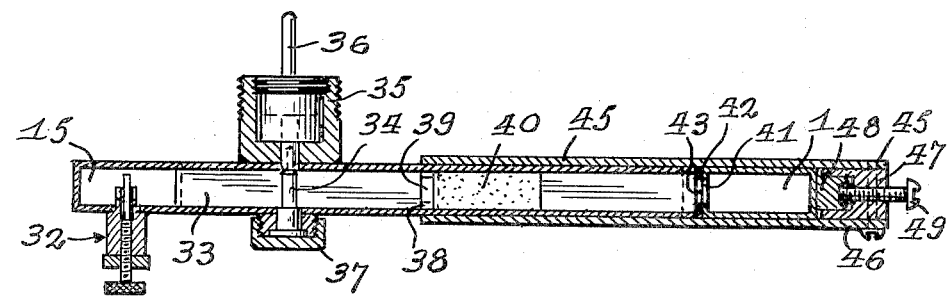
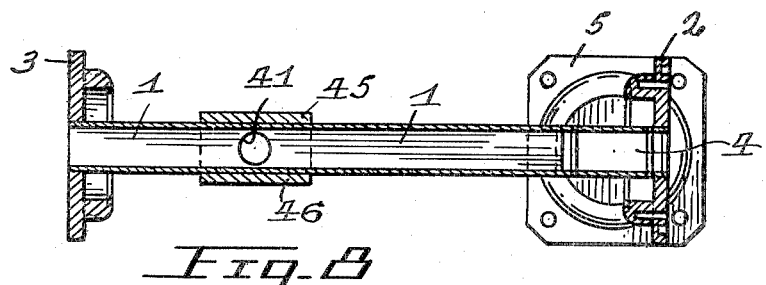
Inventor
Arthur C. Hudson
By W. R. Meredith
Attorney United States Patent Office 2,753,450
Patented July 3, 1956

2,753,450

DUAL OUTPUT MIXER FOR TRANSMIT-RECEIVE SYSTEM

Arthur C. Hudson, Billings Bridge, Ontario, Canada, assignor to National Research Council, Ottawa, Ontario, Canada, a corporation of Canada Application March 14, 1952, Serial No. 276,719

9 Claims. (Cl. 250—20)

This invention relates to an improved dual mixer particularly suitable for use in radar installations wherein a single conducting path carries both outgoing microwave energy to the antenna and received signal energy from the antenna, and wherein a sample of such outgoing microwave energy is applied to an automatic frequency control means and such received signal energy is applied to a receiver unit.

While not restricted thereto, the present invention is particularly applicable to radar installations, being a velocity-modulated tube of the "klystron" type as the local oscillator and wherein the output of such tube is delivered to a wave guide by means of an output antenna or probe of the tube which protrudes into such wave guide.

When such a velocity-modulated tube is employed, what is known as a "standard mount" has frequently been used. A standard mount provides a length of wave guide open at one end and closed at the other, upon which wave guide the tube is supported. The probe of the tube protrudes into the wave guide near the closed end. Energy is delivered from the wave guide at the open end and it is important that looking toward the open end from the probe there shall be a match. A standard mount for one particular tube of the kind referred to, the klystron 2K25 tube, may be found in JAN specifications, JAN–1A–2K25, November 15, 1948, and as shown there the distance from the probe to the closed end is critical and in the case of 2K25 tube is 0.394". When the standard mount is departed from the local oscillator performs in an unsatisfactory manner.

In some dual mixers heretofore used, adjustable mountings have been provided for such a tube to control the amount of local oscillator energy supplied to the mixer, but this has necessarily resulted in a departure from the standard mount and consequent unsatisfactory operation.

Further, with dual mixers making use of velocity-modulated tubes, difficulty has been encountered with mode discontinuities during the automatic frequency control sweep, and it has also been found that such tubes fail to deliver their rated output over the entire operating bandwidth.

In prior art dual mixers where crystal rectifiers have been used as mixing elements in the signal and automatic frequency control channels, it has been found that such channels tend to interact, resulting in difficulties in operation.

It is a principal object of this invention to remove disadvantages of prior art dual mixers.

A further object is to provide a dual mixer wherein a velocity-modulated tube having a probe output may be used under conditions equivalent to those obtaining where a standard mount is used electrically.

An additional object is to provide a dual mixer wherein there are no local oscillator mode discontinuities over the automatic frequency control sweep.

It is an object to provide a dual mixer wherein the local oscillator is capable of delivering its rated output power over the entire operating bandwidth.

A further object is the provision of a dual mixer having means for dividing the local oscillator energy into two channels (to the signal and automatic frequency control crystal rectifiers) with a minimum of interaction between such channels.

It is also an object to provide the aforementioned objects while still retaining the conventional properties of a dual mixer including provision that the magnitude of the energy reaching the signal and automatic frequency control crystal rectifiers is suitable for the average crystal rectifier, and providing a minimum of undesirable coupling of transmit-receive switch leakage to the automatic frequency control crystal rectifier.

The invention has as an object the provision of a dual mixer having few critical tolerances, and wherein various manufacturing imperfections can be permitted without an unfavourable effect on performance.

Other objects will be apparent to one skilled in the art from an examination of the specification and the drawings.

The invention will now be described with reference to the accompanying drawings wherein a preferred embodiment is shown. It will be realized that various changes could be made in the embodiment shown and described, and other apparently different embodiments of the invention could be constructed without departing from the scope thereof. Accordingly it is intended that all matter shown in the accompanying drawings or described herein shall be interpreted as illustrative and not in a limiting sense.

In the drawings, wherein the same reference numerals denote like parts in all figures, Figure 1 shows an oblique three-quarters view of a preferred embodiment of the present invention;

Figure 1:
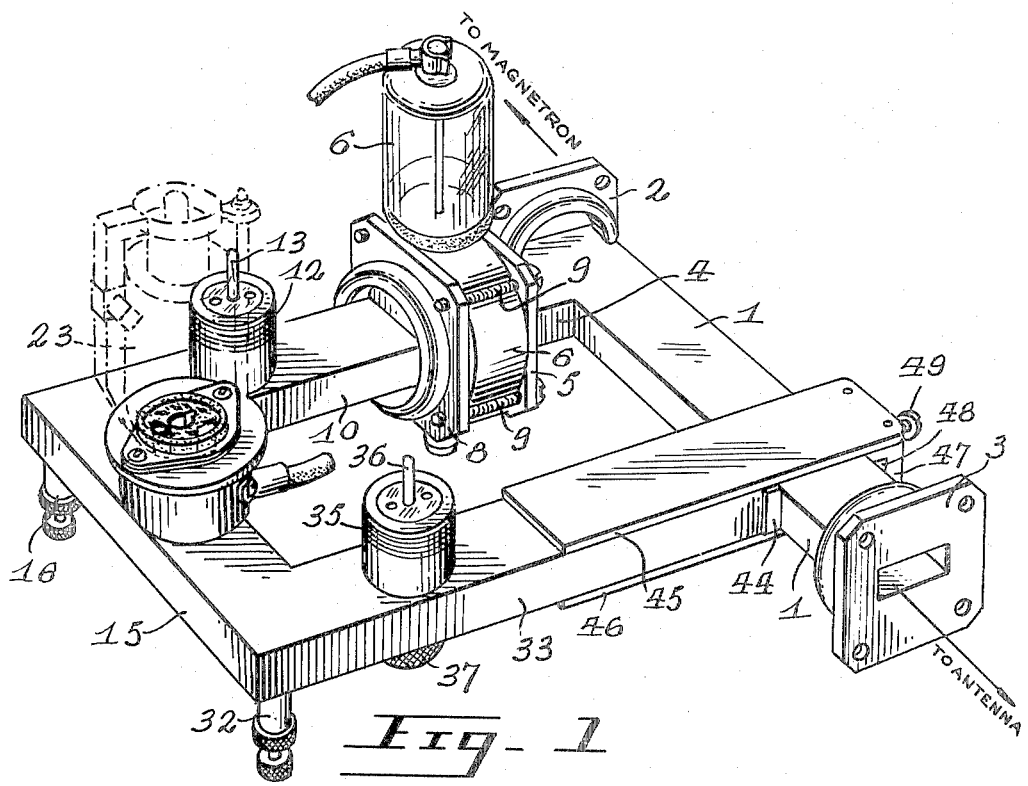
Figure 2:
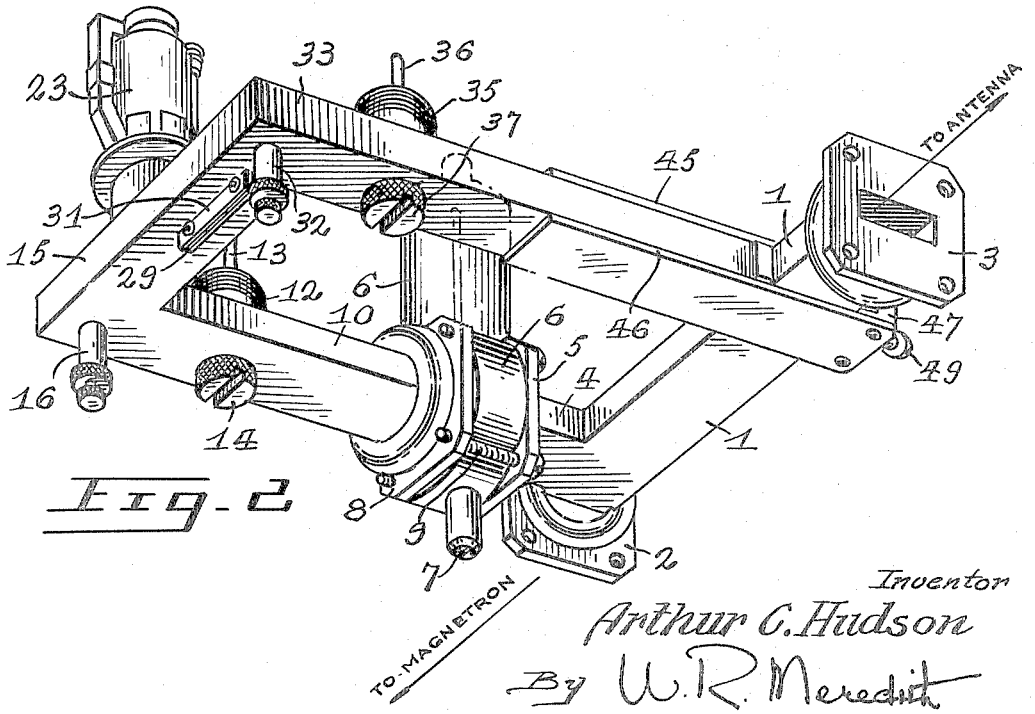
Figure 2 shows a view similar to that shown in Figure 1 wherein the device illustrated in the previous figure is rotated upwardly so as to show several of the external features not visible in Figure 1.
Figure 3:
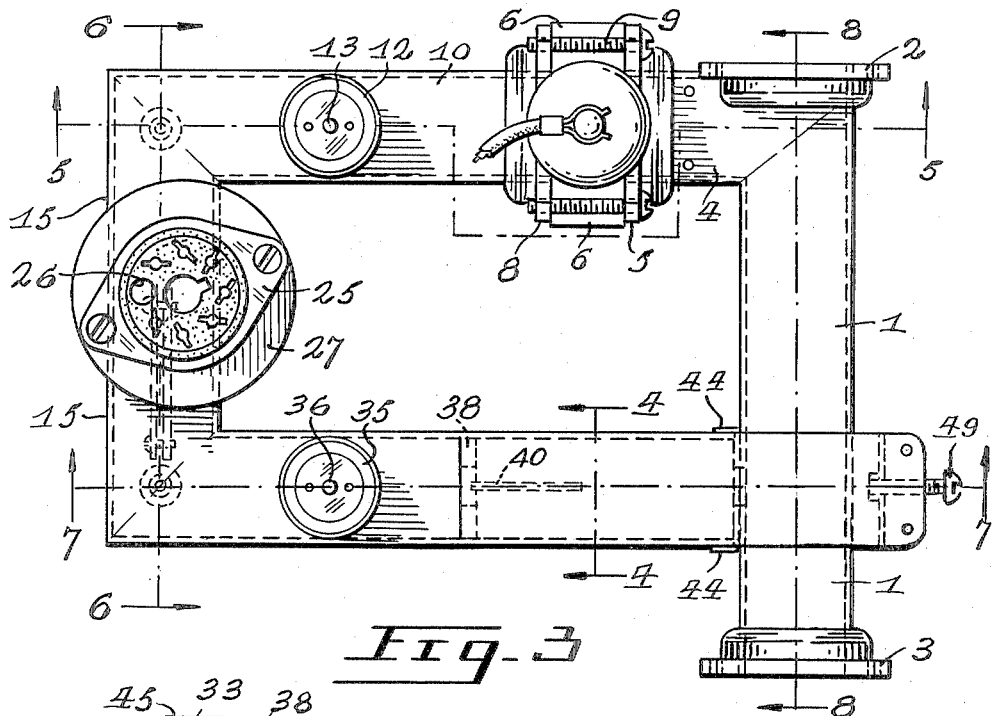
Figure 3 shows a top plan view of the device illustrated in Figures 1 and 2.
Figure 4:
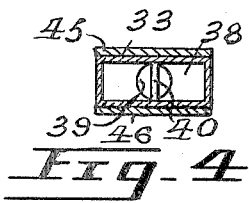
Figure 4 shows a fragmentary cross-sectional view as at the line 4—4 in Figure 3, looking in the direction of the arrows at the said line 4—4.
Figure 5:
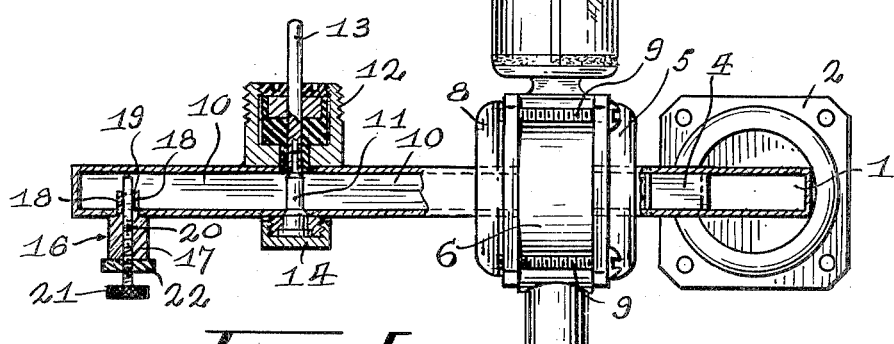

Figures 5, 6, 7 and 8 each show fragmentary cross-sectional views as at the lines 5—5, 6—6, 7—7 and 8—8 respectively in Figure 3, in each case the cross-sectional view being in the direction indicated by the arrows associated with the said lines 5—5, 6—6, 7—7 and 8—8;

Figure 9 shows an oblique three-quarters view of a preferred form of the gasket denoted by reference numeral 9, to be referred to below; and Figure 10 shows a fragmentary cross-sectional view of the preferred form of the adjusting post denoted by reference numerals 16 and/or 32.

Referring to the drawings, it will be seen that the most apparent feature of the mixer disclosed herein is a generally rectangular U-shaped configuration of wave guide members attached to the wave guide channel connecting a high-power source of microwave energy to the antenna. All of such wave guide members would contain a suitable dielectric, such as air. A magnetron would preferably be used as the source of microwave energy and the term "magnetron" will be used herein to denote the same, although it should be understood that other sources of microwave energy could be used.

The wave guide connecting the magnetron to the antenna is shown at 1, and wave guide 1 is preferably fitted with conventional coupling members, such as choke coupling 2 and flat coupling 3. In the particular form shown it is contemplated that the side of the device having coupling 2 thereon shall be in the direction of the magnetron, and that the side having coupling 3 shall be in the direction of the antenna, although the invention is in no way restricted to such arrangement.

While a single wave guide 1 is shown for carrying energy to be transmitted to the antenna, and for conveying signal energy in the opposite direction it will be appreciated that this device could be used in a radar installation having two separate channels for transmitting and receiving and also two antennas.

Attached at right angles to wave guide 1 is a wave guide member denoted by reference numeral 4. The preferred construction is to have wave guides 1 and 4 integral and meeting in a simple T-junction. It is contemplated that the received signal energy will pass from wave guide 1 to wave guide 4, will be later mixed with local oscillator energy in a crystal rectifier and the resultant passed to a receiver (not shown).

A conventional transmit-receive switch denoted as TR switch 6 provided with tuning adjustment 7, is attached to wave guide 4 and on the side of TR switch 6 opposite wave guide 4 is a further wave guide member denoted by 10, the longitudinal axis of which preferably coincides with the longitudinal axis of wave guide 4.

Conventional choke coupling members denoted by 5 and 8 are used to connect TR switch 6 to wave guides 4 and 10 respectively, with the assistance of bolts 9.

A crystal which is preferably a crystal rectifier denoted by 11 (seen in Figure 5) is mounted in wave guide 10 and is provided with a conventional coaxial output mount 12 and pin 13. The construction of the said output mount is such as to provide a coaxial line forming a radio-frequency choke of a type well-known in the art.

It is contemplated that the intermediate frequency stage of a signal receiver (not shown) will be connected to the output mount 12. A cap denoted by 14 is used to hold crystal 11 in place and to allow its removal and replacement.

A wave guide member denoted by 15 is connected to wave guide 10 preferably by means of an unmatched right-angle bend. It has been found satisfactory to make wave guides 10 and 15 integral in construction. It is contemplated that local oscillator energy will be fed into wave guide 15 where such energy will divide in two directions, a part of such energy passing to wave guide 15 and thence to the receiver in one direction and a part of the local oscillator energy passing to the automatic frequency control means in the opposite direction. The local oscillator tube is shown at 23 and its relationship to the other parts of the device and its function will be described in greater detail below.

Mounted at the boundary between wave guides 10 and 15, and preferably on the intersection of their center lines, is an adjusting post denoted by 16. Adjusting post 16, illustrated in detail in Figure 10, consists of a threaded nut member 17 electrically connected to the wave guide wall and provided with spring fingers 18 each having knife edges 19 and a shaft member 20 threaded for approximately half its length adapted to make threadable engagement with nut member 17 and to be gripped firmly at its unthreaded portion by the knife edges 19 of spring fingers 18. The shaft member 20 is provided with head 21, and lock nut 22 is provided for fixing shaft member 20 in a particular position.

It has been found satisfactory to make the spring fingers 18 and the knife edges 19 of a beryllium-copper alloy and to use four of such spring fingers. By means of this simple construction of adjusting post 16 it is possible to avoid the use of an expensive adjustable post employing a radio-frequency choke.

In addition one of the principal advantages of using an unmatched corner with an adjusting post 16 located as described is that certain manufacturing imperfections can be compensated for at post 16. For example, in constructing a joint between wave guides 10 and 15, it would be standard practice to cut each of the wave guides at a 45° angle and join them by soldering or brazing. As a result of these steps certain roughness or irregularity often remains on the inside of the joint, the effect of which is to add susceptance at the joint. Such susceptance is small compared to the susceptance of post 16, and since the latter is adjustable no separate compensation need be made, post 16 being merely adjusted to have the proper overall susceptance.

Parallel to wave guides 4 and 10 is another wave guide member denoted by reference numeral 33 which makes connection with wave guides 1 and 15. It is contemplated that a small portion of the magnetron energy will pass from wave guide 1 to wave guide 33, will be mixed with local oscillator energy and the resultant passed to an automatic frequency control means (not shown).

Wave guide 33 is preferably connected to wave guide 15 by means of an unmatched right-angle bend similar to that used at the junction of wave guides 10 and 15, wave guides 15 and 33 being preferably integral. An adjusting post denoted by 32 is mounted at the junction of wave guides 15 and 33 and need not be further described since its construction and method of mounting is similar to that of adjusting post 16 already described.

Mounted in wave guide 33 is a crystal rectifier denoted by 34 (see in Figure 7) and is provided with a conventional coaxial output mount 35 and pin 36. A cap 37 is also provided. Crystal 34 and its associated elements just referred to are preferably identical with those described in connection with crystal 16. It is contemplated that the first intermediate frequency stage of an automatic frequency control means (not shown) will be connected to the output mount 35.

In wave guide 33, between crystal 34 and wave guide 1, there is provided a cutoff attenuator denoted by 38, suitably held in place. Attenuator 38 is quite conventional in construction and is provided with an opening 39. Disposed on the longitudinal axis of wave guide 33 is a resistive attenuator strip denoted by 40, and again this element is quite conventional.

Wave guide 33 makes connection with wave guide 1 in a manner which will allow compensation of small manufacturing variations in the wave guide components. It would, of course, be possible to make all the wave guide components very accurately in which case the connection between wave guides 1 and 33 could be in the form of a rigid T-junction, but this would necessitate very close tolerances in the dimensions and would greatly increase the manufactring cost without any significant improvement in the operation of the device. In order to provide for such compensation a clamping arrangement is provided at the junction of wave guides 1 and 33 to be described below. It is also within the scope of the present invention to provide a short length of flexible wave guide for example, as part of wave guides 1 or 33, but such construction would not be as strong mechanically as that shown. A small opening denoted by 41 is provided in wave guide 1 preferably positioned so as to be substantially symmetrical about the longitudinal axis of wave guide 33 when wave guides 1 and 33 are in their assembled position. In order to allow for machining tolerances, a gasket denoted by 42, made of yieldable conducting material such as lead, is adapted to fit over opening 41 and is provided with an opening 43, preferably larger than opening 41 and adapted to register therewith.

Gasket 42 is preferably rectangular in shape with dimensions at least as great as the external dimensions of the cross-section of wave guide 33, so that gasket 42 is able to cover the end of wave guide 33 facing wave guide 1. While not essential, it is convenient for assembling the device if gasket 42 be provided with positioning lugs 44 formed by short projections bent at right-angles to the main surface of gasket 42 and at each end thereof.

In order to provide firm clamping of wave guide 33 against gasket 42 and wave guide 1, the construction shown has been found convenient; two longitudinal bars denoted by 45 and 46 are fastened to wave guide 33 and yoke 47 is rigidly attached to bars 45 and 46 between their ends, the dimensions being shown so that wave guide 1 may be embraced thereby. Clamping block 48 and clamping screw 49 enable the assembly to be tightened.

In the embodiment of the invention described, wave guides 1, 4, 10, 15 and 33 all have their H-planes in a common plane, but other configurations are possible. For example, the bends between wave guides 10 and 15, and between wave guides 15 and 33 could have their E-planes in a common plane. Appropriate changes would then have to be made in the other components, but such changes would be apparent to one skilled in the art.

The relationship of local oscillator tube 23 to the other components will now be described.

Referring particularly to Figures 3 and 6, the local oscillator tube shown at 23 is mounted in socket 25, in turn carried by support 27.

The output probe of tube 23, denoted by 25, has the usual coaxial construction, its outer conductor being indicated by 28. Probe 24 passes through opening 26 in socket 25 and thence into wave guide 15. Under ordinary conditions of operation, it is immaterial whether the outer conductor 28 of probe 24 touches the wave guide wall through which it passes, since the tube shell, the outer conductor 28 and the wave guide wall will all be at ground potential. If however it is desired to operate the tube shell at a potential above ground, thus creating a potential difference between outer conductor 28 and the wave guide wall, it has been found satisfactory to provide an insulating bushing of suitable size and shape between the probe 24 and the wall of wave guide 15.

Various other modifications will occur to one skilled in the art. For example, a choke joint could be used at the point where probe 24 passes through the wave guide wall, but this has not generally been found necessary.

A matched resistive strip attenuator denoted by reference numeral 29 is provided protruding into wave guide 15 through slot 30, attenuator 29 being disposed in a direction parallel to the longitudinal axis of wave guide 15, and held in such position by clamp 31.

On the opposite side of output probe 24 from attenuator 29 is adjusting post 16 already referred to. Adjusting post 16 is of such length that it has a large variable susceptance which is preferably inductive. It is contemplated that part of the local oscillator energy will flow from probe 24 toward post 16. So far as such local oscillator energy is concerned, because of the susceptance of post 16, the latter presents substantially a short circuit, and almost all the energy incident on post 16 is reflected. By turning the shaft 20 of adjusting post 16, the amount reflected can be varied, and most of the energy not reflected is passed on toward crystal 11. Accordingly, post 16 acts as both a reflector of local oscillator energy and as a control of local oscillator energy passed to crystal 11.

Post 16 could alternatively have such lesser length that its susceptance would be capacitive, and this would also present substantially a short circuit to the local oscillator energy reaching post 16. Using a post with inductive susceptance has the advantage however that if shaft 20 has a conventional right-hand thread, which is preferable in the interest of manufacturing economy and ease of replacement, turning shaft 20 in a clockwise direction will result in increased flow of local oscillator energy past post 16, making such adjustment consistent with that conventionally used on controls of various kinds.

Whether the susceptance of post 16 is inductive or capacitive, a perfect short-circuit is not produced, and some of the local oscillator energy flows past post 16 and reaches crystal 11, the amount of energy flowing past being controllable by adjustment of post 16.

The local oscillator energy also flows from output probe 24 to crystal 34 in the course of which some of the energy is dissipated by attenuator 29 and some is reflected by post 32. With respect to the energy flowing from the output probe 24 to crystal 34, adjusting post 32, like post 16, provides convenient control.

The operation of the device will be apparent from the foregoing description but for greater certainty will now be outlined.

The radar set of which the embodiment of the present invention forms a part has a cycle of operation which includes a transmitting portion and a receiving portion. During the whole cycle local oscillator tube 23 continuously feeds energy to wave guide 15, portions of which energy are applied to crystals 11 and 34.

Local oscillator energy from the output probe 24 of local oscillator tube 23 travels in both directions in wave guide 15. Of this energy travelling toward post 16, a small portion is transmitted past this post, but a much larger portion is reflected, the electrical susceptance of post 16 being chosen relative to the admittance of the wave guide 15 at the post location to achieve such reflection. In a standard mount for a tube such as tube 23 substantially all the energy incident on the closed end of the wave guide is reflected therefrom and in the present device post 16 reflects a sufficiently large portion to approximate the shortcircuit of the standard mount.

In order that such reflected energy from post 16 may simulate the corresponding energy in the standard mount, it is also necessary that it return to output probe 24 in the same phase as obtains in the standard mount. This may be achieved by a suitable choice of the distance between output probe 24 and post 16 in wave guide 15, and can be easily provided for by one skilled in the art.

The portion of the local oscillator energy which travels in the opposite direction from output probe 24 towards the adjusting post 32 must not be reflected back appreciably toward probe 24 in order that the standard mount be approximated. This is achieved by providing adequate attenuation in matched attenuator 29. Cut-off attenuator 38 provides a suitable reflecting means so that crystal 34 may be substantially matched to the characteristic impedance of wave guide 33 and TR switch 6 provides a similar reflecting means with respect to crystal 11. TR switch 6 reflects most of the energy reaching it from local oscillator tube 23 because the TR switch is sharply tuned to the signal frequency, which of course differs from the local oscillator frequency.

During the transmitting portion of the operation energy from the magnetron enters wave guide 1 and passes to the antenna. Energy which passes down the wave guide 4 is reflected from the TR switch 5 and returns to the junction of wave guides 1 and 4 in such phase that it reinforces energy flowing toward the antenna.

A small fraction of the energy from the magnetron passes through the coupling hole 41, the opening 43 in gasket 42, the resistive attenuator 40 and the cut-off attenuator 38 and reaches the crystal rectifier 34. In order to substantially match crystal 34 to the characteristic impedance of wave guide 33 in relation to the magnetron energy reaching crystal 34, adjusting post 32 forms a suitable reflector.

In crystal rectifier 34 the energy from the magnetron is mixed with energy from the local oscillator tube 23. The difference frequency between the magnetron and the local oscillator energy is generated in the crystal rectifier 34 and fed through mount 35 to a conventional intermediate frequency amplifier and thence to a conventional discriminator (not shown). The output from such discriminator is amplified and applied to the reflector of the local oscillator tube 23 in such polarity as to correct the frequency of tube 23 to the desired value.

During the receiving portion of the operation, the received signal which returns through wave guide 1 from the antenna reaches the mixer after the magnetron has stopped oscillating or is "cold." This energy is substantially matched to the crystal rectifier 11 through the TR switch 6. The energy which passes to the cold magnetron is reflected therefrom in such phase as to reinforce the received energy flowing through the TR switch to the crystal rectifier 11, the length of the wave guide path to and within the magnetron being properly adjusted to achieve this effect. Alternatively an Anti-TR switch could be used between the junction of wave guides 1 and 4 and the magnetron, whichever expedient is used, on reaching the crystal rectifier 11 the received energy is mixed in crystal rectifier 11 with energy from local oscillator tube 23 and the resulting beat frequency passed to an intermediate frequency amplifier in the conventional manner.

In order that crystal 11 may be substantially matched to the characteristic impedance of wave guide 10 with respect to the signal energy reaching crystal 11 from wave guide 1, adjusting post 16 forms a suitable reflecting means.

It will be seen that the invention disclosed herein has many advantages and is a considerable improvement over dual mixers known in the prior art.

I claim:

1. A dual mixer for accepting electromagnetic waves from at least two sources and mixing said electromagnetic waves so that their difference frequency becomes available to at least two utilization devices such as a receiver and an automatic frequency control device comprising, in combination with an antenna channel, a second channel having cross-sectional shape substantially uniform throughout its length connected to said antenna channel at two points, an output of electromagnetic waves in said second channel physically positioned substantially midway between said two points, susceptance means in said second channel physically positioned between said output and one of said points, rectifier means in said second channel physically positioned between said susceptance means and said one of said points; attenuator means in said second channel physically positioned between said output and the second of said points, second susceptance means in said channel physically positioned between said attenuator means and said second of said points and second rectifier means in said channel physically positioned between said second susceptance means and said second of said points.

2. A dual mixer for accepting electromagnetic waves from at least two sources and mixing said electromagnetic waves so that their difference frequency becomes available to at least two utilization devices such as a receiver and an automatic frequency control device comprising, in combination with an antenna channel, a second channel having cross-sectional shape substantially uniform throughout its length connected to said antenna channel at two points, an output of electromagnetic waves in said second channel physically positioned substantially midway between said two points, susceptance means in said second channel physically positioned between said output and one of said points, rectifier means in said second channel physically positioned between said susceptance means and said one of said points; a transmit-receive switch physically positioned between said rectifier means and said one of said points, attenuator means in said second channel physically positioned between said output and the second of said points, second susceptance means in said channel physically positioned between said attenuator means and said second of said points; second rectifier means in said channel physically positioned between said second susceptance means and said second of said points and second attenuator means physically positioned between said second rectifier means and said second of said points.

3. A dual mixer for accepting electromagnetic waves from at least two sources and mixing said electromagnetic waves so that their difference frequency becomes available to at least two utilization devices such as a receiver and an automatic frequency control device comprising, in combination with an antenna channel, a second channel having cross-sectional shape substantially uniform throughout its length connected to said antenna channel at two points, an output of electromagnetic waves in said second channel physically positioned substantially midway between said two points, variable susceptance means in said second channel physically positioned between said output and one of said points, rectifier means in said channel physically positioned between said susceptance means and said one of said points; attenuator means in said second channel physically positioned between said output and the second of said points, second variable susceptance means in said channel physically positioned between said attenuator means and said second of said points and second rectifier means in said channel physically positioned between said second susceptance means and said second of said points.

4. A dual mixer for accepting samples of electromagnetic waves generated at a high power level for transmission purposes as well as for accepting relatively weak received electromagnetic waves and mixing each of said electromagnetic waves with other electromagnetic waves produced by a local oscillator so that the difference frequency of each mixing becomes available to both a receiver and an automatic frequency control device, comprising a signal channel having cross-sectional shape substantially uniform throughout its length for conveying received electromagnetic waves, a local oscillator channel having cross-sectional shape substantially uniform throughout its length connected to said signal channel, an automatic frequency control channel having cross-sectional shape substantially uniform throughout its length connected to said local oscillator channel, said local oscillator channel having substantially midway therein output means whereby local oscillator electromagnetic waves are applied to said local oscillator channel, said signal channel and said automatic frequency control channel each being provided with rectifier means therein, susceptance means being provided substantially at the junction of said signal channel and said local oscillator channel, additional susceptance means being provided substantially at the junction of said local oscillator channel and said automatic frequency control channel, and attenuator means in said local oscillator channel physically positioned between said output means and said last-mentioned susceptance means.

5. A device according to claim 4 wherein said local oscillator channel meets both said signal channel and said automatic frequency control means at an abrupt angle.

6. In a dual mixer including a local oscillator channel assembly for coupling the output signal of a local oscillator to each of a pair of mixing elements over independent transmission paths, a local oscillator channel assembly comprising a linear waveguide section having a cross-sectional form substantially uniform throughout its length, an input probe coupled to the output of said local oscillator and projecting through a first side wall of said waveguide section substantially midway with respect to the length of said waveguide section with energy being transmitted in both directions in said waveguide section, an adjustable susceptance post projecting through the side wall of the waveguide section opposite the wall through which said probe projects and at substantially a first terminal portion of said section which is coupled to a first mixing element of said dual mixer, said susceptance post presenting substantially a short-circuit to said local oscillator signal thereby substantially reflecting the incident energy to said probe and conducting to said associated mixing element a substantially attenuated local oscillator signal, the length of the waveguide section between said post and probe being such that the signal reflected by said post arrives at said probe in phase with the local oscillator output, and a matched resistive strip attenuator projecting through the same waveguide side wall as said post with the input probe being interveningly positioned, said attenuator transmitting energy substantially unidirectionally to a second terminal portion of said waveguide section coupled to the second mixing element.

7. In a dual mixer including a local oscillator channel assembly for coupling the output signal of a local oscillator to each of a pair of mixing elements over independent transmission paths, a local oscillator channel assembly comprising a liner waveguide section having a cross-sectional form substantially uniform throughout its length, an input probe coupled to the output of said local oscillator and projecting through a first side wall of said waveguide section substantially midway with respect to the length of said waveguide section with energy being transmitted in both directions in said waveguide section, an adjustable susceptance post projecting through the side wall of the waveguide section opposite the wall through which said probe projects and at substantially a terminal portion of said section which is coupled to a first mixing element of said dual mixer, said susceptance post presenting substantially a short-circuit to said local oscillator signal thereby substantially reflecting the incident energy to said probe and conducting to said associated mixing element a substantially attenuated local oscillator signal, the length of the waveguide section between said post and probe being such that the signal reflected by said post arrives at said probe in phase with the local oscillator output, a matched resistive strip attenuator projecting through the same side wall as said post with the input probe being interveningly positioned, said attenuator transmitting energy substantially unidirectionally to a second terminal portion of said waveguide section coupled to the second mixing element, and a second adjustable susceptance post projecting through the same side wall as said first post at substantially the second terminal portion of said waveguide section.

8. In a dual mixer including a local oscillator channel assembly for coupling the output signal of a local oscillator to each of a pair of mixing elements over independent transmission paths, a local oscillator channel assembly comprising a waveguide section having a cross-sectional form substantially uniform throughout its length, input means connected to the output of said local oscillator and coupled to said waveguide section substantially midway with respect to the length thereof with energy being transmitted in both directions in said section, susceptance means positioned at substantially a first terminal portion of said section which is coupled to a first mixing element of said dual mixer, said susceptance means presenting substantially a short-circuit to said local oscillator signal thereby substantially reflecting the incident energy to said input means and conducting to said associated mixing element a substantially attenuated local oscillator signal, the length of the waveguide section between said susceptance means and input probe being such that the signal reflected by said susceptance means arrives at said input means in phase with the local oscillator output, unidirectional transmitting means including an attenuator positioned within said waveguide section on the side of said input means opposite said susceptance means, said transmitting means providing for energy transfer substantially unidirectionally to a second terminal portion of said waveguide section which is coupled to said second mixing element.

9. In a dual mixer including a local oscillator channel assembly for coupling the output signal of a local oscillator to each of a pair of mixing elements over independent transmission paths, a local oscillator channel assembly comprising a waveguide section having a cross-sectional form substantially uniform throughout its length, input means connected to the output of said local oscillator and coupled to said waveguide section substantially midway with respect to the length thereof with energy being transmitted in both directions in said section, susceptance means positioned at substantially a first terminal portion of said section which is coupled to a first mixing element of said dual mixer, said susceptance means presenting substantially a short-circuit to said local oscillator signal thereby substantially reflecting the incident energy to said input means and conducting to said associated mixing element a substantially attenuated local oscillator signal, the length of the waveguide section between said susceptance means and input probe being such that the signal reflected by said susceptance means arrives at said input means in phase with the local oscillator output, unidirectional transmitting means including an attenuator positioned within said waveguide section on the side of said input means opposite said susceptance means, said transmitting means providing for energy transfer unidirectionally to a second terminal portion of said waveguide section which is coupled to said second mixing element, and a second susceptance means positioned at substantially the second terminal portion of said waveguide section.

References Cited in the file of this patent

UNITED STATES PATENTS

| Number | Name | Date |
| --- | --- | --- |
| 2,479,650 | Tiley | Aug. 23, 1949 |
| 2,518,931 | Pound | Aug. 15, 1950 |
| 2,567,825 | Pound | Sept. 11, 1951 |
| 2,568,090 | Riblet | Sept. 18, 1951 |
| 2,569,129 | Kamm | Sept. 25, 1951 |
| 2,579,327 | Lund | Dec. 18, 1951 |

OTHER REFERENCES

"Microwave Converters" by C. F. Edwards, Proc. IRE, vol. 35, November 1947, pages 1181–1191, Bell Telephone System Technical Publication, Monograph B-1495.